(12) United States Patent
Jeong et al.

(10) Patent No.: US 12,728,700 B2
(45) Date of Patent: Sep. 8, 2026

(54) HEAT PUMP SYSTEM FOR A VEHICLE

(71) Applicants: HYUNDAI MOTOR COMPANY, Seoul (KR); KIA CORPORATION, Seoul (KR)

(72) Inventors: Seong-Bin Jeong, Seongnam-si (KR); Dongseok Oh, Hwaseong-si (KR); Jae-Eun Jeong, Hwaseong-si (KR); Yong Woong Cha, Yongin-si (KR); Wan Je Cho, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 136 days.

(21) Appl. No.: 18/624,764

(22) Filed: Apr. 2, 2024

(65) Prior Publication Data

US 2025/0100347 A1 Mar. 27, 2025

(30) Foreign Application Priority Data

Sep. 21, 2023 (KR) ........................ 10-2023-0126513

(51) Int. Cl.
*B60H 1/00* (2006.01)

(52) U.S. Cl.
CPC ..... *B60H 1/00899* (2013.01); *B60H 1/00321* (2013.01); *B60H 2001/00961* (2019.05)

(58) Field of Classification Search
CPC ............ B60H 1/00899; B60H 1/00321; B60H 2001/00961; B60H 2001/00307; B60H 2001/00949; B60H 2001/3291; B60H 1/00914; B60H 1/00278; B60H 1/3227; B60H 1/143; B60H 1/321; B60H 2001/3285; F25B 43/006; F25B 2400/054; B60Y 2200/90
See application file for complete search history.

(56) References Cited

U.S. PATENT DOCUMENTS

2021/0291622 A1 * 9/2021 Durrani .............. B60H 1/32281
2022/0275983 A1 * 9/2022 Kawano ................ F25B 49/005

FOREIGN PATENT DOCUMENTS

DE 102020119813 A1 * 2/2022 ......... B60H 1/32284
DE 102020133636 A1 * 6/2022 ........... B60H 1/3213

(Continued)

*Primary Examiner* — Kun Kai Ma
(74) *Attorney, Agent, or Firm* — Lempia Summerfield Katz LLC

(57) ABSTRACT

A heat pump system for a vehicle may include: a compressor configured to compress a refrigerant; and a heat, ventilation, and air condition (HVAC) module including an internal condenser, an evaporator connected to the compressor via a refrigerant line, and an opening/closing door configured to adjust air having passed through the evaporator to be selectively introduced into the internal condenser depending on a cooling mode or a heating mode of the vehicle. The heat pump system may also include: a heat-exchanger connected to the internal condenser via the refrigerant line; a first expansion valve provided in the refrigerant line between the heat-exchanger and the evaporator; a first connection line; a chiller provided in the first connection line so as to adjust the temperature of a coolant by exchanging heat between the refrigerant and the coolant introduced selectively; and a sub-heat-exchanger provided in the refrigerant line.

16 Claims, 4 Drawing Sheets

(56) References Cited

FOREIGN PATENT DOCUMENTS

| | | | | | |
|---|---|---|---|---|---|
| KR | 20120093670 | A | | 8/2012 | |
| KR | 20140083295 | A | | 7/2014 | |
| KR | 20140097688 | A | | 8/2014 | |
| KR | 20190057768 | A | * | 5/2019 | ......... B60H 1/00385 |
| KR | 20190057770 | A | * | 5/2019 | ............. B60H 1/143 |
| KR | 20200038748 | A | * | 4/2020 | ......... B60H 1/00899 |
| KR | 20200078000 | A | * | 7/2020 | .............. B60L 58/27 |
| WO | WO-2020030556 | A1 | * | 2/2020 | .............. F25B 49/02 |

* cited by examiner 12
13
14
16
11
10
17
11
11
4
2
21
18
23
20
11
30
11
11
11
31
41
43
11
11
15

2
4
10
11
12
13
14
15
16
17
18
20
21
23
30
31
41
43

HEAT PUMP SYSTEM FOR A VEHICLE

CROSS-REFERENCE TO RELATED APPLICATION

This application claims priority to and the benefit of Korean Patent Application No. 10-2023-0126513 filed on Sep. 21, 2023, the entire contents of which are incorporated herein by reference.

BACKGROUND

(a) Field

The present disclosure relates to a heat pump system for a vehicle. More particularly, the present disclosure relates to a heat pump system for a vehicle capable of efficiently adjusting the temperature of a heating element, and efficiently performing frost prevention and dehumidification of a heat-exchanger.

(b) Description of the Related Art

Generally, an air conditioning system for a vehicle includes an air conditioner unit circulating a refrigerant in order to heat or cool an interior of the vehicle.

The air conditioner unit is used to maintain the interior of the vehicle at an appropriate temperature regardless of a change in an external temperature. The air conditioning unit is configured to heat or cool the interior of the vehicle. This is achieved by exchanging heat using a condenser and an evaporator in a process in which a refrigerant discharged by driving a compressor is circulated back to the compressor through the condenser, a receiver drier, an expansion valve, and the evaporator.

In other words, the air conditioner unit lowers a temperature and a humidity of the interior of the vehicle by condensing a high-temperature high-pressure gas-phase refrigerant compressed from the compressor by the condenser, passing the refrigerant through the receiver drier and the expansion valve, and then evaporating the refrigerant in the evaporator in a cooling mode.

In accordance with a continuous increase in interest in energy efficiency and environmental pollution, the development of an environmentally-friendly vehicle capable of substantially substituting for an internal combustion engine vehicle is desired. The environmentally-friendly vehicle is classified into an electric vehicle driven using a fuel cell or electricity as a power source and a hybrid vehicle driven using an engine and a battery.

In the electric vehicle or the hybrid vehicle among the environmentally-friendly vehicles discussed above, a separate heater is not used unlike an air conditioner of a general vehicle. Additionally, an air conditioner used in the environmentally-friendly vehicle is generally called a heat pump system.

The electric vehicle driven by a power source of a fuel cell generates driving force by converting chemical reaction energy between oxygen and hydrogen into electrical energy. In this process, heat energy is generated by a chemical reaction in a fuel cell. Therefore, it is desired to secure the performance of the fuel cell to effectively remove generated heat.

In addition, a hybrid vehicle generates driving force by driving a motor using electricity supplied from the fuel cell described above or an electrical battery, together with an engine operated by a general fuel. Therefore, heat generated from the fuel cell or the battery and the motor should be effectively removed in order to secure performance of the motor.

Therefore, in the hybrid vehicle or the electric vehicle according to the related art, a cooling means, a heat pump system, and a battery cooling system, respectively, should be configured as separate closed circuits so as to prevent heat generation from the motor, an electric component, and the battery including a fuel cell.

Therefore, the size and weight of a cooling module disposed at the front of the vehicle are increased, and a layout of connection pipes supplying a refrigerant and a coolant to each of the heat pump system, the cooling means, and the battery cooling system in an engine compartment becomes complicated.

In addition, since a battery cooling system for heating or cooling the battery according to a state of the vehicle is separately provided to obtain an optimal performance of the battery, a plurality of valves for selectively interconnecting connections pipes is employed. Thus, noise and vibration due to frequent opening and closing operations of the valves may be introduced into the vehicle interior, thereby deteriorating the ride comfort.

In addition, when heating the vehicle interior, the heating performance may be deteriorated due to the lack of a heat source. Additionally, the electricity consumption may be increased due to the usage of the electric heater, and the power consumption of the compressor may be increased.

The above information disclosed in the Background section is only to enhance understanding of the background of the present disclosure. Therefore, the background section may contain information that does not form the prior art that is already known to a person of ordinary skill in the art.

SUMMARY

The present disclosure provides a heat pump system for a vehicle capable of efficiently adjusting the temperature of a heating element, and efficiently performing frost prevention and dehumidification of a heat-exchanger when heating the vehicle interior by using a single chiller where a refrigerant and a coolant exchange heat.

In one embodiment of the present disclosure, a heat pump system for a vehicle may include: a compressor configured to compress a refrigerant circulating the heat pump system; and a heat, ventilation, and air condition (HVAC) module including an internal condenser, an evaporator connected to the compressor via a refrigerant line, and an opening/closing door configured to adjust an air having passed through the evaporator to be selectively introduced into the internal condenser depending on a cooling mode or a heating mode of the vehicle. The heat pump system may also include a heat-exchanger connected to the internal condenser via the refrigerant line, a first expansion valve provided in the refrigerant line between the heat-exchanger and the evaporator, and a first connection line. The first connection line may include a first end connected to the refrigerant line between the heat-exchanger and the first expansion valve, and a second end connected to the refrigerant line between the evaporator and the compressor. The heat pump system may also include a chiller provided in the first connection line so as to adjust the temperature of a coolant by exchanging heat between the refrigerant and the coolant introduced selectively. The heat pump system may also include a sub-heat-exchanger provided in the refrigerant line. In particular, the sub-heat-exchanger is configured to exchange heat between i) the refrigerant having passed through an internal condenser or the heat-exchanger, and ii) the refrigerant having passed through at least one of the evaporator and the chiller so as to increase a condensation amount by increasing sub-cooling of the refrigerant.

The sub-heat-exchanger may be connected to the refrigerant line connecting the heat-exchanger and the first expansion valve, and the refrigerant line connecting the evaporator and the compressor, respectively.

In another embodiment, a heat pump system may further include: a second expansion valve provided in the first connection line upstream of the chiller; and a second connection line having a first end connected to the second expansion valve, and a second end connected to the refrigerant line between the internal condenser and the heat-exchanger. The heat pump system may further include: a third expansion valve provided in the refrigerant line between the internal condenser and the heat-exchanger; and a third connection line having a first end connected to the third expansion valve, and a second end connected to the refrigerant line between the heat-exchanger and the sub-heat-exchanger.

The heat-exchanger may be configured to condensate or evaporate the refrigerant by exchanging heat with ambient air based on a selective operation of the third expansion valve.

The second expansion valve and the third expansion valve may be electronic expansion valves configured to selectively expand the refrigerant while controlling the flow of the refrigerant.

In the heating mode of a vehicle interior, the refrigerant line connecting the sub-heat-exchanger and the first expansion valve may be closed. The refrigerant line connecting the first expansion valve and the evaporator may be closed. The first connection line may be opened by an operation of the second expansion valve. The second connection line may be closed by the operation of the second expansion valve. The third connection line may be closed by an operation of the third expansion valve. The refrigerant discharged from the internal condenser may flow along the refrigerant line, and may flow into the heat-exchanger along the refrigerant line opened by the third expansion valve. The second expansion valve may be configured to flow the refrigerant introduced via the first connection line to the chiller without expansion. Additionally, the third expansion valve may be configured to expand the refrigerant introduced via the refrigerant line, and flow the expanded refrigerant into the heat-exchanger.

The heat-exchanger may be configured to recollect ambient air heat while evaporating the refrigerant supplied from the third expansion valve by exchanging heat with ambient air.

The sub-heat-exchanger may be configured to exchange heat between the refrigerant having passed through the heat-exchanger and the refrigerant having passed through the chiller.

In a heating and dehumidifying mode of a vehicle interior, the refrigerant line connecting the first expansion valve and the evaporator may be opened by an operation of the first expansion valve. The refrigerant line connecting the third expansion valve and the heat-exchanger and the refrigerant line connecting the heat-exchanger and the sub-heat-exchanger may be closed by an operation of the third expansion valve. The first connection line may be closed by an operation of the second expansion valve. The second connection line may be opened by the operation of the second expansion valve. The third connection line may be opened by the operation of the third expansion valve. A partial refrigerant among the refrigerant discharged from the internal condenser may flow into the second connection line. A remaining refrigerant among the refrigerant discharged from the internal condenser may flow into the third connection line. The first expansion valve may be configured to expand the refrigerant introduced via the refrigerant line. The second expansion valve may be configured to expand the refrigerant introduced via the second connection line and flow the expanded refrigerant to the chiller. Additionally, the third expansion valve may be configured to flow the refrigerant introduced via the refrigerant line to the third connection line without expansion.

The sub-heat-exchanger may be configured to exchange heat between i) the refrigerant flowing via the third connection line and the refrigerant line and ii) the refrigerant discharged from the evaporator and the chiller, respectively, and flowing via the respective refrigerant line.

When defrosting the heat-exchanger in the heating mode of a vehicle interior, the refrigerant line connecting the sub-heat-exchanger and the first expansion valve may be closed. The refrigerant line connecting the first expansion valve and the evaporator may be closed. The refrigerant line connecting the third expansion valve and the heat-exchanger and the refrigerant line connecting the heat-exchanger and the sub-heat-exchanger are closed by an operation of the third expansion valve. The first connection line may be opened by an operation of the second expansion valve. The second connection line may be closed by the operation of the second expansion valve. The third connection line may be opened by the operation of the third expansion valve. The refrigerant discharged from the internal condenser may flow into the third connection line. The second expansion valve may be configured to expand the refrigerant introduced via the first connection line and flow the expanded refrigerant to the chiller. Additionally, the third expansion valve may be configured to flow the refrigerant introduced via the refrigerant line to the third connection line without expansion.

The sub-heat-exchanger may be configured to exchange heat between the refrigerant flowing via the third connection line and the refrigerant line and the refrigerant discharged from the chiller and introduced via the respective refrigerant line.

A heat pump system for a vehicle may further include an accumulator provided in the refrigerant line between the evaporator and the compressor.

The sub-heat-exchanger may be a double-tube heat-exchanger configured to exchange heat between refrigerants having different temperatures.

The chiller may be connected to a heating element via a coolant line through which the coolant circulates.

When defrosting the heat-exchanger in the heating mode of a vehicle interior, or in a heating and dehumidifying mode of the vehicle interior, the coolant may circulate via the coolant line such that the coolant having passed through the heating element may be supplied to the chiller.

The chiller may recollect a waste heat of the heating element while exchanging heat between the coolant introduced via the coolant line and the refrigerant, or may cool the heating element by using the coolant having exchanged heat with the refrigerant.

As described above, a heat pump system for a vehicle according to an embodiment may efficiently adjust the temperature of a heating element, and efficiently perform frost prevention and dehumidification of heat-exchanger when heating the vehicle interior. This is achieved by using a single chiller where a refrigerant and a coolant exchange heat.

In addition, according to the present disclosure, by efficiently managing the temperature of heating elements including an electrical component and a battery module, the optimal performance of the electrical component and the battery module may be enabled, and the overall travel distance of the vehicle may be increased through efficient management of the battery module.

In addition, according to the present disclosure, in the heating mode of the vehicle interior, heating efficiency may be improved by selectively using the ambient air heat and the waste heat of the heating element.

In addition, according to the present disclosure, by employing a sub-heat-exchanger configured to exchange heat between the low-temperature refrigerant and the high-temperature refrigerant with, an increase of sub-cooling of the refrigerant may be achieved, thereby improving the overall performance and efficiency.

In addition, according to an embodiment, it is possible to reduce manufacturing cost and weight through simplification of an entire system, and to improve space utilization.

BRIEF DESCRIPTION OF THE DRAWINGS

These drawings are for reference only in describing embodiments of the present disclosure. Therefore, the technical idea of the present disclosure should not be limited to the accompanying drawings.

DETAILED DESCRIPTION

Figure 1:
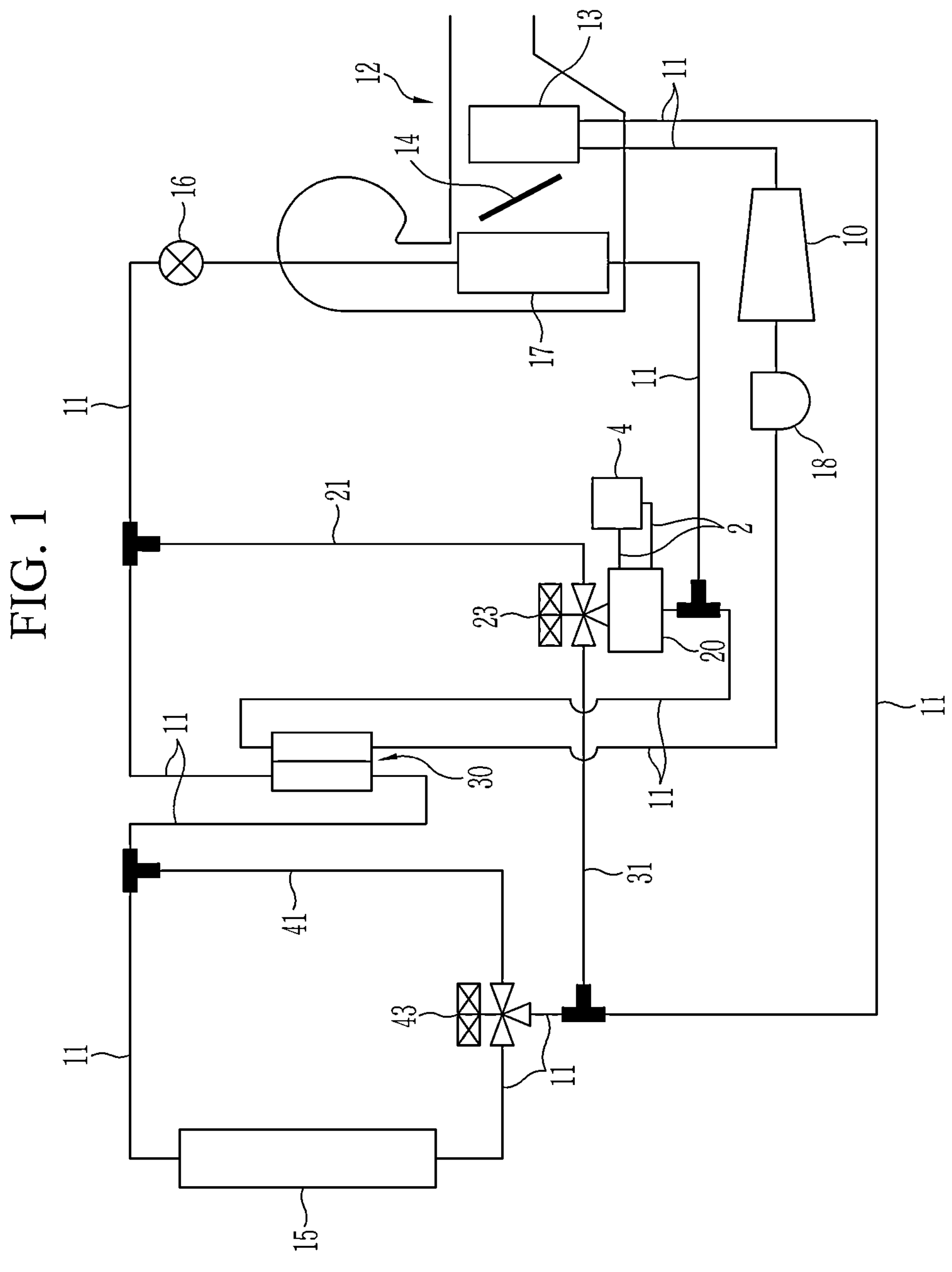
FIG. 1 is a block diagram illustrating a heat pump system for a vehicle according to an embodiment.

The embodiments are hereinafter described in detail with reference to the accompanying drawings.

The embodiments disclosed in the present disclosure and the constructions depicted in the drawings are only some of the embodiments of the present disclosure, and do not cover the entire scope of the present disclosure. Therefore, it should be understood that there may be various equivalents and variations at the time of the application of this present disclosure.

In order to clarify the present disclosure, parts that are not related to the description have been omitted, and the same elements or equivalents are referred to with the same reference numerals throughout the present disclosure.

Also, the size and thickness of each element are arbitrarily shown in the drawings, but the present disclosure is not necessarily limited thereto. Additionally, in the drawings, the thickness of layers, films, panels, regions, and the like, are exaggerated for clarity.

In addition, unless explicitly described to the contrary, the words "comprise" and variations such as "comprises" or "comprising," should be understood to imply the inclusion of stated elements but not the exclusion of any other elements.

Furthermore, each of the terms, such as " . . . unit," " . . . means," " . . . portions," " . . . part," and " . . . member" described in the present disclosure, mean a unit of a comprehensive element that performs at least one function or operation.

When a component, device, element, or the like of the present disclosure is described as having a purpose or performing an operation, function, or the like, the component, device, or element should be considered herein as being "configured to" meet that purpose or perform that operation or function.

FIG. 1 is a block diagram illustrating a heat pump system for a vehicle according to an embodiment.

A heat pump system for a vehicle according to an embodiment may efficiently adjust temperature of a heating element 4 by using a single chiller 20 where a refrigerant and a coolant exchange heat. Additionally, at the time of heating of a vehicle interior, the heat pump system may efficiently perform the frost prevention and dehumidification of a heat-exchanger 15.

The heating element 4 may include an electrical component and a battery module. The electrical component may include an electric power control apparatus, an inverter, or an on-board charger (OBC).

In other words, referring to FIG. 1, the heat pump system may include: a compressor 10; a heating, ventilation, and air conditioning (HVAC) module 12; the heat-exchanger 15; a first expansion valve 16; an evaporator 17; the chiller 20; a first connection line 21; and a sub-heat-exchanger 30.

First, the compressor 10 may compress the introduced refrigerant and flow the compressed refrigerant to the refrigerant line 11 such that the refrigerant may circulate along a refrigerant line 11.

In the present embodiment, an internal condenser 13 and the evaporator 17 connected through the refrigerant line 11 may be provided inside the HVAC module 12.

Additionally, an opening/closing door 14 configured to adjust ambient air having passed through the evaporator 17 to be selectively introduced into the internal condenser 13 may be provided inside the HVAC module 12 between the evaporator 17 and the internal condenser 13.

At the time of heating the vehicle interior, the opening/closing door 14 may be opened such that the ambient air having passed through the evaporator 17 may be introduced into the internal condenser 13.

In other words, the high-temperature refrigerant supplied to the internal condenser 13 may heat the ambient air passing through the internal condenser 13. Since the introduced ambient air is converted to a high-temperature state while passing through the internal condenser 13 and then introduced into the vehicle interior, the heating of the vehicle interior may be realized.

To the contrary, at the time of cooling the vehicle interior, the opening/closing door 14 may close a side toward the internal condenser 13 such that the ambient air cooled while passing through the evaporator 17 may be directly introduced into the vehicle interior.

Accordingly, the ambient air passing through the evaporator 17 may be cooled by the low-temperature refrigerant supplied to the evaporator 17, while passing through the evaporator 17. Since the cooled ambient air is introduced into the vehicle interior, the vehicle interior may be cooled.

In the present embodiment, the heat-exchanger 15 may be connected to the internal condenser 13 through the refrigerant line 11. The heat-exchanger 15 may be disposed in a front portion of the vehicle.

In other words, the heat-exchanger 15 may be an air-cooled heat-exchanger configured to exchange heat between the introduced refrigerant and the ambient air.

The first expansion valve 16 may be provided in the refrigerant line 11 connecting the heat-exchanger 15 and the evaporator 17. The first expansion valve 16 may selectively expand the introduced refrigerant.

The heat pump system may further include an accumulator 18 provided in the refrigerant line 11 between the evaporator 17 and the compressor 10. The accumulator 18 may supply the gaseous refrigerant to the compressor 10, thereby improving efficiency and durability of the compressor 10.

In the present embodiment, the chiller 20 may be provided in the first connection line 21. The chiller 20 may be connected to the heating element 4 through (e.g., via) the coolant line 2 through which the coolant circulates. Accordingly, the coolant may selectively circulate through an interior of the chiller 20.

The chiller 20 configured as such may adjust the temperature of the coolant by exchanging heat between the refrigerant introduced into the first connection line 21 and the selectively introduced coolant.

In more detail, the chiller 20 may adjust the temperature of the coolant by exchanging heat between the supplied refrigerant and the coolant. The chiller 20 may be a water-cooled heat-exchanger that exchanges heat between the interiorly introduced refrigerant and the coolant.

A first end of the first connection line 21 may be connected to the refrigerant line 11 between the heat-exchanger 15 and the first expansion valve 16. A second end of the first connection line 21 may be connected to the refrigerant line 11 between the evaporator 17 and the compressor 10.

In more detail, the second end of the first connection line 21 may be connected to the refrigerant line 11 between the evaporator and the accumulator 18.

In other words, the chiller 20 may adjust the temperature of the coolant by exchanging heat between the coolant selectively introduced through the coolant line 2 and the selectively supplied refrigerant. The coolant having exchanged heat in the chiller 20 may circulate the heating element 4 through the coolant line 2.

A water pump (not shown) may be provided in the coolant line 2. In other words, the coolant may circulate the coolant line 2 based on an operation of the water pump (not shown).

Accordingly, the coolant having exchanged heat with the refrigerant in the chiller 20 may adjust the temperature of the battery module and the electrical component included in the heating element 4, while being selectively supplied to the heating element 4.

In other words, in the case of a heating mode of the vehicle interior, a heating and dehumidifying mode of the vehicle interior, or a heating and defrosting mode of the vehicle interior, the coolant may circulate through the coolant line 2 such that the coolant having passed through the heating element 4 may be supplied to the chiller 20.

The defrosting mode may be operated when frost occurs in the heat-exchanger 15.

The chiller 20 may recollect a waste heat of the heating element 4 while exchanging heat between the coolant introduced through the coolant line 2 and the refrigerant, or may cool the heating element 4 by using the coolant having exchanged heat with the refrigerant.

In the present embodiment, the sub-heat-exchanger 30 may be provided in the refrigerant line 11. The sub-heat-exchanger 30 may exchange heat between the refrigerant having passed through the internal condenser 13 or the heat-exchanger 15 and the refrigerant having passed through at least one of the evaporator 17 and the chiller 20 to increase a condensation amount by increasing sub-cooling of the refrigerant.

The sub-heat-exchanger 30 may be connected to the refrigerant line 11 connecting the heat exchanger 15 and the first expansion valve 16 and the refrigerant line 11 connecting the evaporator 17 and the compressor 10, respectively.

The sub-heat-exchanger 30 configured as such may be a double-tube heat-exchanger configured to exchange heat between refrigerants having different temperatures.

The heat pump system configured as such may further include a second expansion valve 23, a second connection line 31, a third connection line 41, and a third expansion valve 43.

First, the second expansion valve 23 may be provided in the first connection line 21 upstream of the chiller 20.

The second expansion valve 23 may be an electronic expansion valve that selectively expands the refrigerant while controlling the flow of the supplied refrigerant.

The second expansion valve 23 may be disposed upstream of the chiller 20 based on a flow direction of the refrigerant flowing along the first connection line 21 such that the refrigerant may be introduced before being supplied to the chiller 20.

In other words, the upstream of the chiller 20 may be set based on the flow direction of the refrigerant. Based on a direction in which the refrigerant flows along the first connection line 21, a location from which the refrigerant flows into the chiller 20 may be defined as the upstream of the chiller 20, and a location to which the refrigerant is discharged from the chiller 20 may be defined as a downstream (e.g., rear end) of the chiller 20.

In the present embodiment, a first end of the second connection line 31 may be connected to the second expansion valve 23. A second end of the second connection line 31 may be connected to the refrigerant line 11 between the internal condenser 13 the heat-exchanger 15.

The third expansion valve 43 may be provided in the refrigerant line 11 between the internal condenser 13 and the heat-exchanger 15.

The third expansion valve 43 may be an electronic expansion valve that selectively expands the refrigerant while controlling the flow of the supplied refrigerant.

The heat-exchanger 15 may condensate or evaporate the refrigerant by exchanging heat with the ambient air based on a selective operation of the third expansion valve 43.

A first end of the third connection line 41 may be connected to the third expansion valve 43. A second end of the third connection line 41 may be connected to the refrigerant line 11 between the heat-exchanger 15 the sub-heat-exchanger 30.

In the heat pump system configured as such, the refrigerant discharged from one or all of the evaporator 17 and the chiller 20 may exchange heat with the refrigerant supplied from the internal condenser 13 or the heat-exchanger 15 in the sub-heat-exchanger 30. Then the refrigerant may be supplied to the compressor 10.

In other words, the refrigerant discharged from the internal condenser 13 or the heat-exchanger 15 and the refrigerant of the low temperature and low pressure discharged from one or all of the evaporator 17 and the chiller 20 may be introduced into the sub-heat-exchanger 30.

Accordingly, the sub-heat-exchanger 30 may further lower the temperature of the refrigerant, and increase the condensation level, by additionally exchanging heat between the refrigerant of the low-temperature and the refrigerant of an intermediate temperature.

As such, since the sub-heat-exchanger 30 may further condense the refrigerant condensed at the internal condenser 13 or the heat-exchanger 15, sub-cooling of the refrigerant may be increased. Accordingly, the coefficient of performance (COP), which is a coefficient of the cooling capability compared to the power required by the compressor 10, may be improved.

Hereinafter, an operation of a heat pump system for a vehicle according to an embodiment configured as described above is described in detail with reference to FIGS. 2-4.

First, the operation in the heating mode of the vehicle interior is described with reference to FIG. 2.

Figure 2:
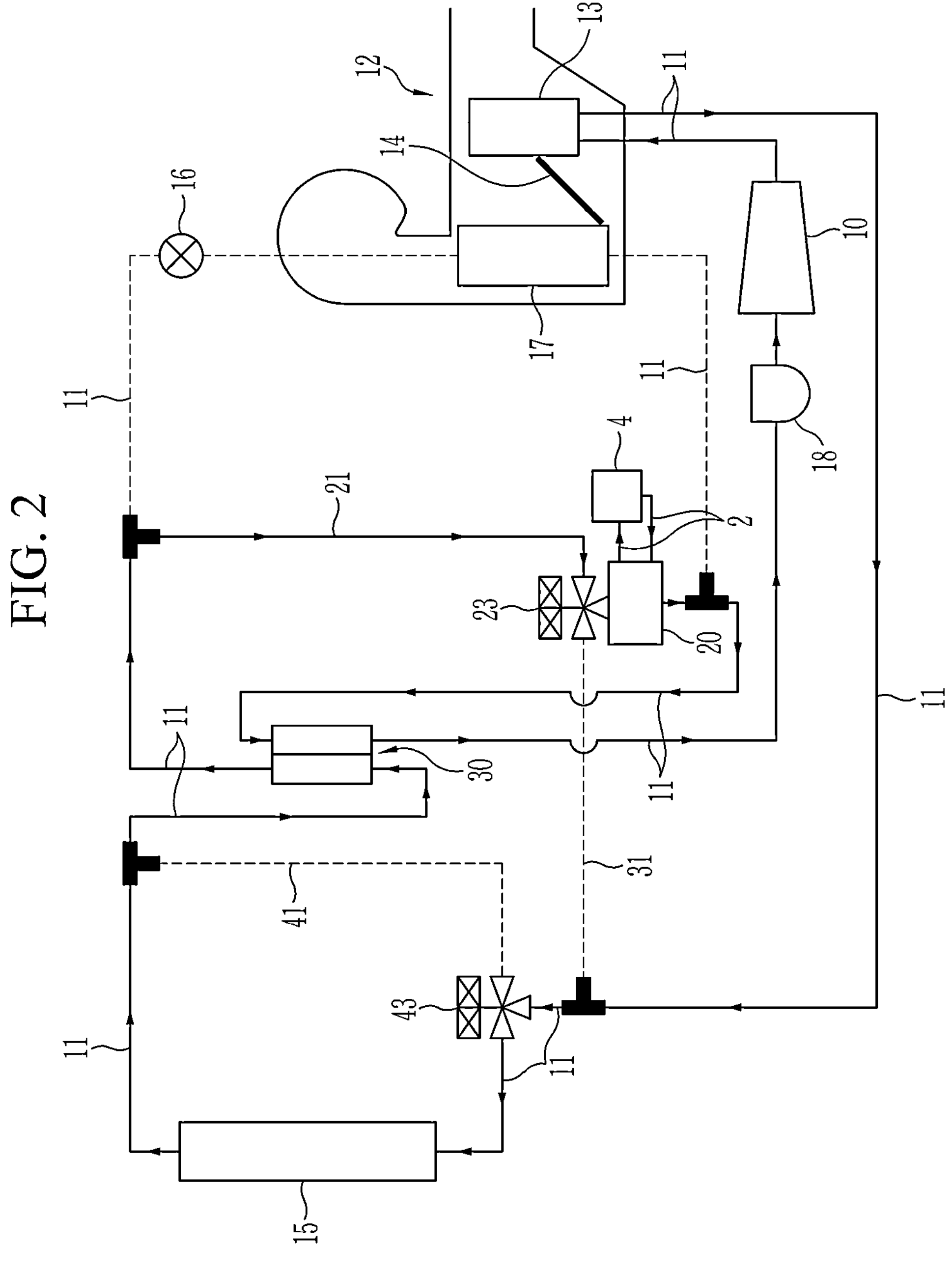
FIG. 2 is an operation diagram illustrating a heat pump system for a vehicle according to an embodiment, in a heating mode of the vehicle interior.

FIG. 2 is an operation diagram illustrating a heat pump system for a vehicle according to an embodiment, in the heating mode of the vehicle interior.

Referring to FIG. 2, in the heating mode of the vehicle interior, the heat pump system may recollect the ambient air heat and the waste heat of the heating element 4.

In the present embodiment, when in the heating mode of the vehicle interior, the refrigerant line 11 connecting the sub-heat-exchanger 30 and the first expansion valve 16 may be closed.

Simultaneously, the refrigerant line 11 connecting the first expansion valve 16 and the evaporator 17 may be closed.

The first connection line 21 may be opened by an operation of the second expansion valve 23.

In the present embodiment, the second connection line 31 may be closed by the operation of the second expansion valve 23.

In addition, the third connection line 41 may be closed by the operation of the third expansion valve 43.

In such a state, when the compressor 10 is operated for heating of the vehicle interior, the refrigerant discharged from the compressor 10 may flow into the internal condenser 13 along the refrigerant line 11.

The opening/closing door 14 may be opened such that the ambient air introduced into the HVAC module 12 may pass through the internal condenser 13.

Accordingly, when passing through the evaporator 17 that is not supplied with the refrigerant, the ambient air introduced from the outside may be introduced into the evaporator 17 at a room temperature state without being cooled. Since the introduced ambient air is converted to a high-temperature state while passing through the internal condenser 13 and then introduced into the vehicle interior, the heating of the vehicle interior may be realized.

The refrigerant discharged from the internal condenser 13 may flow along the refrigerant line 11, and may flow into the heat-exchanger 15 along the refrigerant line 11 that is opened by the third expansion valve 43.

The third expansion valve 43 may expand the refrigerant introduced through the refrigerant line 11 and flow the expanded refrigerant to the heat-exchanger 15.

Accordingly, the heat-exchanger 15 may recollect the ambient air heat by receiving the expanded refrigerant from the third expansion valve 43 and evaporating the expanded refrigerant by exchanging heat with the ambient air.

The refrigerant having passed through the heat-exchanger 15 may flow to the sub-heat-exchanger 30 along the refrigerant line 11. The refrigerant having passed through the sub-heat-exchanger 30 may flow to the second expansion valve 23 along the first connection line 21.

The second expansion valve 23 may flow the refrigerant introduced through the first connection line 21 to the chiller 20 without expansion.

The refrigerant having passed through the chiller 20 may pass through the sub-heat-exchanger 30 along the refrigerant line 11 and then flow to the accumulator 18.

In other words, the sub-heat-exchanger 30 may exchange heat between the refrigerant having passed through the heat-exchanger 15 and the refrigerant having passed through the chiller 20.

The coolant having an increased temperature by absorbing the waste heat from the heating element 4 may be supplied to the chiller 20 through the coolant line 2. The coolant having its temperature increased may be supplied to the chiller 20.

The chiller 20 may recollect the waste heat of the heating element 4 from the coolant having an increased temperature by exchanging heat between the refrigerant and the coolant.

In other words, when heating of the vehicle interior is required, the heat pump system according to the present embodiment may absorb the ambient air heat from the heat-exchanger 15, and increase the temperature of the refrigerant by using the waste heat of the heating element 4, thereby reducing power consumption of the compressor 10, and improving heating efficiency.

In addition, according to the present disclosure, the heating efficiency and performance may be improved while minimizing usage of a separate electric heater.

In the present embodiment, the operation in the heating and dehumidifying mode of the vehicle interior is described with reference to FIG. 3.

Figure 3:
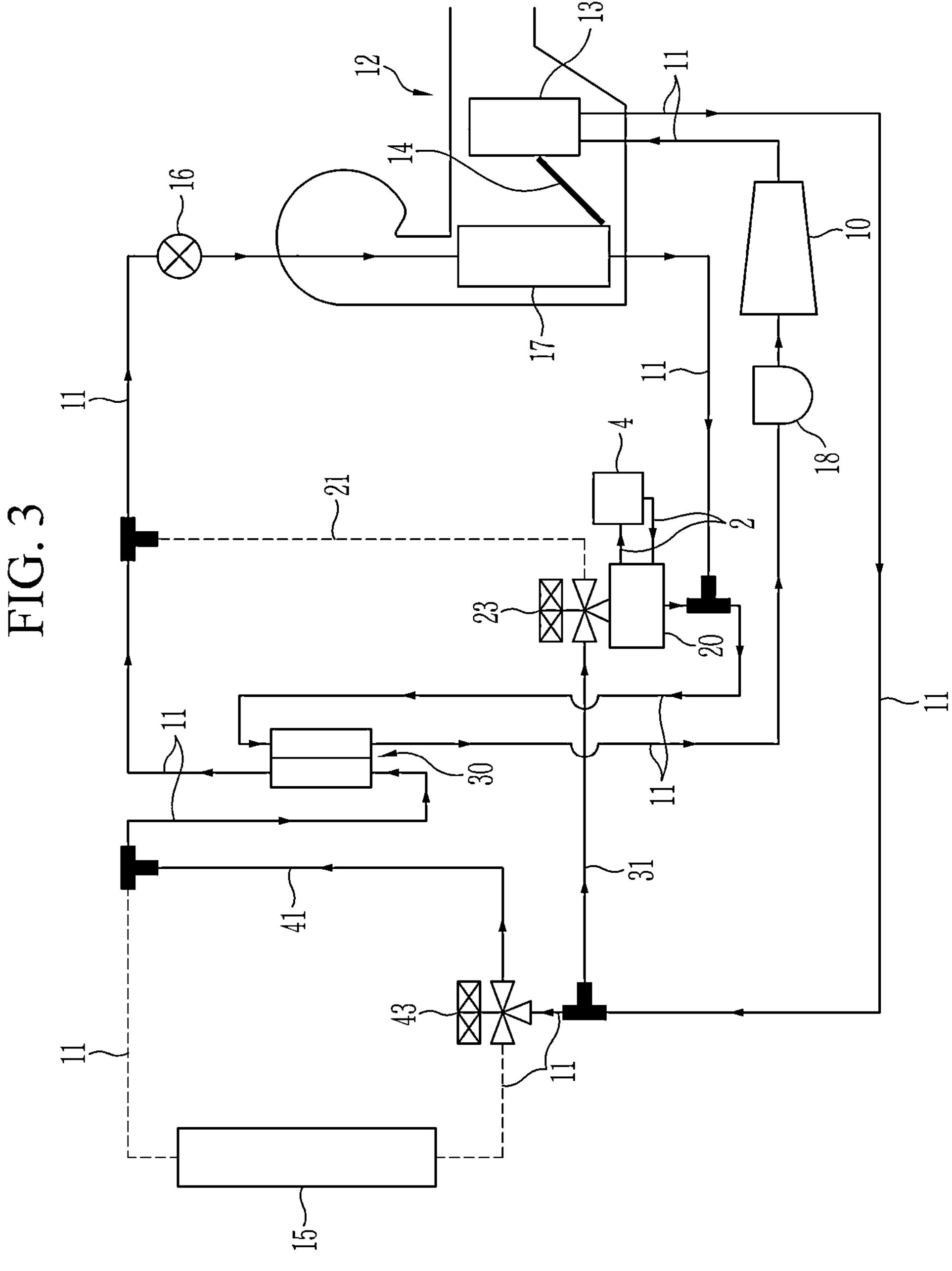
FIG. 3 is an operation diagram illustrating a heat pump system for a vehicle according to an embodiment, in a heating and dehumidifying mode of the vehicle interior.

FIG. 3 is an operation diagram illustrating a heat pump system for a vehicle according to an embodiment, in the heating and dehumidifying mode of the vehicle interior.

Referring to FIG. 3, in the heating and dehumidifying mode of the vehicle interior, the refrigerant line 11 connecting the first expansion valve 16 and the evaporator 17 may be opened by an operation of the first expansion valve 16.

The first expansion valve 16 may expand the refrigerant introduced through the refrigerant line 11.

Simultaneously, the refrigerant line 11 connecting the third expansion valve 43 and the heat-exchanger 15 and the refrigerant line 11 connecting the heat-exchanger 15 and the sub-heat-exchanger 30 may be closed by the operation of the third expansion valve 43.

The first connection line 21 may be closed by the operation of the second expansion valve 23. The second connection line 31 may be opened by the operation of the second expansion valve 23.

In addition, the third connection line 41 may be opened by the operation of the third expansion valve 43.

In such a state, when the compressor 10 is operated to heat the vehicle interior, the refrigerant discharged from the compressor 10 may flow into the internal condenser 13 along the refrigerant line 11.

A partial refrigerant among the refrigerant discharged from the internal condenser 13 may flow into the second connection line 31.

The second expansion valve 23 may expand the refrigerant introduced through the second connection line 31 and flow the expanded refrigerant to the chiller 20.

The coolant having an increased temperature by absorbing the waste heat from the heating element 4 may be supplied to the chiller 20 through the coolant line 2. The coolant having its temperature increased may be supplied to the chiller 20.

The chiller 20 may recollect the waste heat of the heating element 4 from the coolant having an increased temperature by exchanging heat between the expanded refrigerant and the coolant.

In other words, when heating and dehumidifying of the vehicle interior is require, the heat pump system according to the present embodiment may increase the temperature of the refrigerant by using the waste heat of the heating element 4, thereby reducing power consumption of the compressor 10, and improving heating efficiency.

In addition, a remaining refrigerant among the refrigerant discharged from the internal condenser 13 may be introduced into the third connection line 41 by the operation of the third expansion valve 43.

The third expansion valve 43 may flow the refrigerant introduced through the refrigerant line 11 to the third connection line 41 without expansion.

The refrigerant introduced into the third connection line 41 may pass through the sub-heat-exchanger 30 while flowing along the refrigerant line 11, and then expanded at the first expansion valve 16.

The refrigerant expanded in the first expansion valve 16 may flow into the evaporator 17 along the refrigerant line 11.

The opening/closing door 14 may open a portion passing through the internal condenser 13 such that the ambient air introduced into the HVAC module 12 may pass through the evaporator 17 and then flow into the internal condenser 13.

Accordingly, since the ambient air dehumidified while passing through the evaporator 17 is converted to a high-temperature state while passing through the internal condenser 13 and then introduced into the vehicle interior, the vehicle interior may be heated and dehumidified.

In other words, the ambient air introduced into the HVAC module 12 may be dehumidified by the low-temperature refrigerant introduced into the evaporator 17 while passing through the evaporator 17. Thereafter, since the air is converted to a high-temperature state while passing through the internal condenser 13 and then introduced into the vehicle interior, the vehicle interior may be smoothly heated and dehumidified.

The refrigerant having passed through the chiller 20 may pass through the sub-heat-exchanger 30 along the refrigerant line 11 and then flow to the accumulator 18, together with the refrigerant having passed through the evaporator 17.

The sub-heat-exchanger 30 may exchange heat between the refrigerant flowing through the third connection line 41 and the refrigerant line 11 and the refrigerant discharged from the evaporator 17 and the chiller 20 and introduced through the refrigerant line 11.

In other words, since the sub-heat-exchanger 30 may further condense the refrigerant that was condensed at the internal condenser 13, sub-cooling of the refrigerant may be increased. Accordingly, the coefficient of performance (COP), which is a coefficient of the cooling capability compared to the power required by the compressor 10, may be improved.

In addition, the refrigerant having passed through the accumulator 18 may repeatedly perform the above-described processes while being supplied to the compressor 10.

In addition, in the present embodiment, the operation in the heating and defrosting mode of the vehicle interior is described with reference to FIG. 4.

Figure 4:
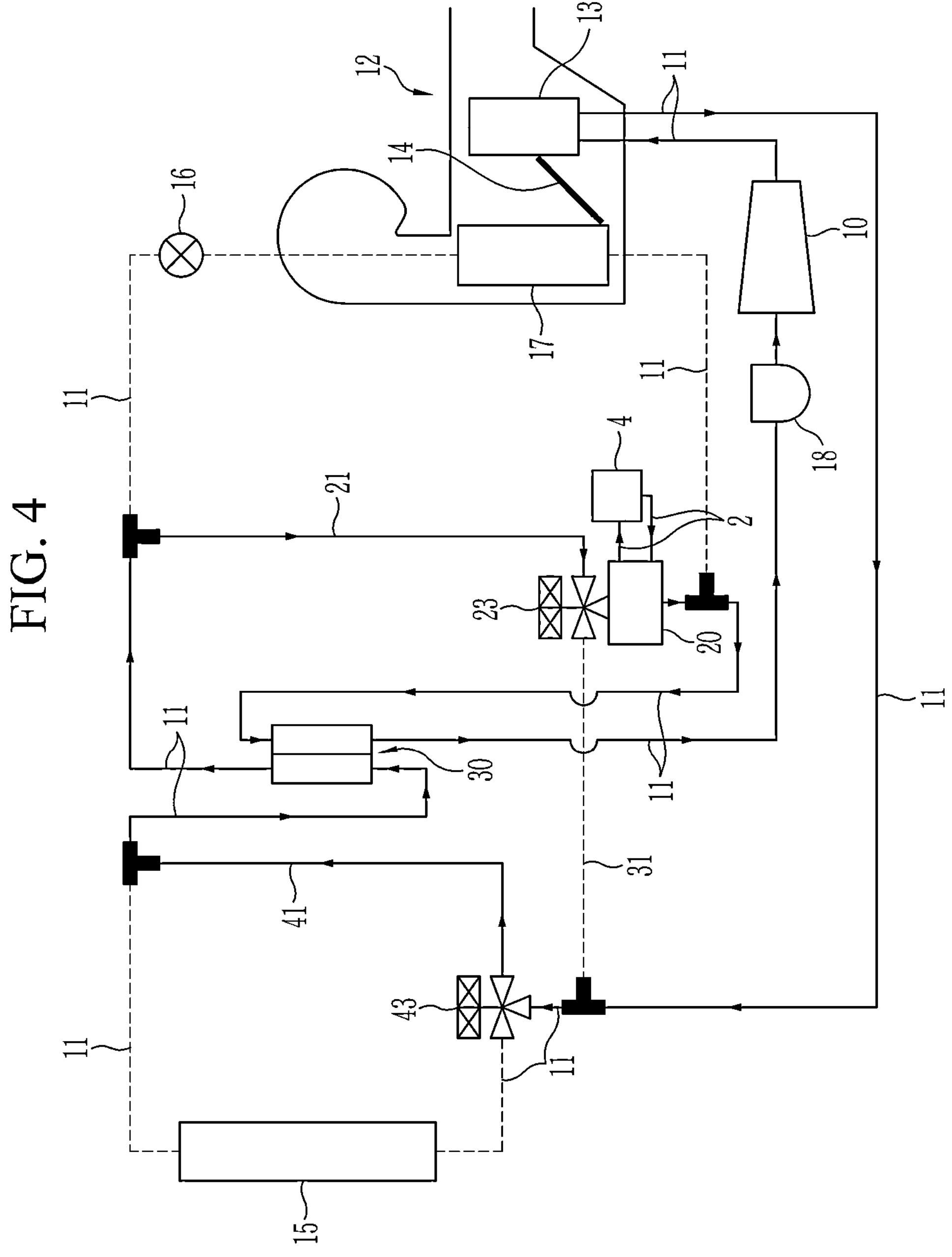
FIG. 4 is an operation diagram illustrating a heat pump system for a vehicle according to an embodiment, in a heating and defrosting mode of the vehicle interior.

FIG. 4 is an operation diagram with respect to the heating and defrosting mode of the vehicle interior in a heat pump system for a vehicle according to an embodiment.

The defrosting mode may be operated when frost occurs in the heat-exchanger 15.

Referring to FIG. 4, the refrigerant line 11 connecting the sub-heat-exchanger 30 and the first expansion valve 16 may be closed. In addition, the refrigerant line 11 connecting the first expansion valve 16 and the evaporator 17 may be closed.

Simultaneously, the refrigerant line 11 connecting the third expansion valve 43 and the heat-exchanger 15 and the refrigerant line 11 connecting the heat-exchanger 15 and the sub-heat-exchanger 30 may be closed by the operation of the third expansion valve 43.

The first connection line 21 may be opened by the operation of the second expansion valve 23.

In the present embodiment, the second connection line 31 may be closed by the operation of the second expansion valve 23.

In addition, the third connection line 41 may be opened by the operation of the third expansion valve 43.

In such a state, when the compressor 10 is operated for heating the vehicle interior, the refrigerant discharged from the compressor 10 may flow into the internal condenser 13 along the refrigerant line 11.

The opening/closing door 14 may be opened such that the ambient air introduced into the HVAC module 12 may pass through the internal condenser 13.

Accordingly, when passing through the evaporator 17 that is not supplied with the refrigerant, the ambient air introduced from the outside may be introduced into the evaporator 17 at a room temperature state without being cooled. Since the introduced ambient air is converted to a high-temperature state while passing through the internal condenser 13 and then introduced into the vehicle interior, the heating of the vehicle interior may be realized.

The refrigerant discharged from the internal condenser 13 may flow along the refrigerant line 11, and may flow into the third connection line 41 by the operation of the third expansion valve 43.

The third expansion valve 43 may flow the refrigerant introduced through the refrigerant line 11 to the third connection line 41 without expansion.

Accordingly, the refrigerant may not flow into the heat-exchanger 15. In other words, in the present embodiment, the refrigerant is stopped from flowing into the heat-exchanger 15 where the frost has occurred, and the refrigerant is introduced into the sub-heat-exchanger 30 through the third connection line 41. As a result, the heat pump system prevents frost from increasing in the heat-exchanger 15 and at the same time, performs the removal of the frost.

The refrigerant having passed through the third connection line 41 may pass through the sub-heat-exchanger 30 connected through the refrigerant line 11. Thereafter, the refrigerant may flow into the second expansion valve 23 along the first connection line 21.

The second expansion valve 23 may expand the refrigerant introduced through the first connection line 21 and flow the expanded refrigerant to the chiller 20.

The refrigerant having passed through the chiller 20 may pass through the sub-heat-exchanger 30 along the refrigerant line 11 and then flow to the accumulator 18.

In other words, the sub-heat-exchanger 30 may exchange heat between the refrigerant flowing through the third connection line 41 and the refrigerant line 11 and the refrigerant discharged from the chiller 20 and introduced through the refrigerant line 11.

The coolant having an increased temperature by absorbing the waste heat from the heating element 4 may be supplied to the chiller 20 through the coolant line 2. The coolant having its temperature increased may be supplied to the chiller 20.

The chiller 20 may recollect the waste heat of the heating element 4 from the coolant having an increased temperature by exchanging between the expanded refrigerant and the coolant.

In addition, the refrigerant having passed through the chiller 20 may pass through the sub-heat-exchanger 30 along the refrigerant line 11 and then flow to the accumulator 18.

In other words, in the heating and defrosting mode of the vehicle interior, the heat pump system according to the present embodiment may increase the temperature of the refrigerant by using the waste heat of the heating element 4. As a result, the heat pump system may reduce the power consumption of the compressor 10, and improve heating efficiency.

In addition, when frost has occurred in the heat-exchanger 15, the heat pump system may stop (e.g., block) the flow of the refrigerant flowing to the heat-exchanger 15 and instead flow the refrigerant through the third connection line 41. As a result, the heat pump system is capable of more rapidly defrosting the heat-exchanger 15.

As described above, a heat pump system for a vehicle according to an embodiment may efficiently adjust the temperature of a heating element 4, and efficiently perform frost prevention and dehumidification of the heat-exchanger 15 at the time of heating the vehicle interior. This is achieved by using the single chiller 20 where the refrigerant and the coolant exchange heat.

In addition, according to the present disclosure, by efficiently managing the temperature of the heating element 4 including an electrical component and a battery module, the optimal performance of the electrical component and the battery module may be enabled, and the overall travel distance of the vehicle may be increased through efficient management of the battery module.

In addition, in the heating mode of the vehicle interior, according to the present disclosure, heating efficiency may be improved by selectively using the ambient air heat and the waste heat of the heating element 4.

In addition, according to the present disclosure, by employing the sub-heat-exchanger 30 configured to exchange heat between the low-temperature refrigerant and the high-temperature refrigerant, an increase of sub-cooling of the refrigerant may be achieved. As a result, the heat pump system may improve the overall performance and efficiency.

In addition, according to an embodiment, it is possible to reduce manufacturing cost and weight through simplification of an entire system, and to improve space utilization.

While the present disclosure has been described in connection with what is presently considered to be practical embodiments, it should be understood that the disclosure is not limited to the disclosed embodiments. On the contrary, the present disclosure is intended to cover various modifications and equivalent arrangements included within the spirit and scope of the appended claims.

DESCRIPTION OF SYMBOLS

2: the coolant line
4: heating element
10: compressor
11: the refrigerant line
12: HVAC module
13: internal condenser
14: opening/closing door
15: heat-exchanger
16: first expansion valve
17: evaporator
18: accumulator
20: chiller
21: first connection line
23: second expansion valve
30: sub-heat-exchanger
31: second connection line
41: third connection line
43: third expansion valve

What is claimed is:

1. A heat pump system for a vehicle, comprising:
a compressor configured to compress a refrigerant circulating the heat pump system;
a heat, ventilation, and air condition (HVAC) module including an internal condenser, an evaporator connected to the compressor via a refrigerant line, and an opening/closing door configured to adjust air having passed through the evaporator to be selectively introduced into the internal condenser based on a cooling mode or a heating mode of the vehicle;
a heat-exchanger connected to the internal condenser via the refrigerant line;
a first expansion valve provided in the refrigerant line between the heat-exchanger and the evaporator;
a first connection line including:
a first end connected to the refrigerant line between the heat-exchanger and the first expansion valve, and
a second end connected to the refrigerant line between the evaporator and the compressor;
a chiller provided in the first connection line so as to adjust a temperature of a coolant by exchanging heat between the refrigerant and the coolant introduced selectively;
a sub-heat-exchanger provided in the refrigerant line, and configured to exchange heat between the refrigerant having passed through an internal condenser or the heat-exchanger and the refrigerant having passed through at least one of the evaporator and the chiller so as to increase a condensation amount by increasing sub-cooling of the refrigerant;
a second expansion valve provided in the first connection line upstream of the chiller;
a second connection line having a first end connected to the second expansion valve, and a second end connected to the refrigerant line between the internal condenser and the heat-exchanger;
a third expansion valve provided in the refrigerant line between the internal condenser and the heat-exchanger; and
a third connection line having a first end connected to the third expansion valve, and a second end connected to the refrigerant line between the heat-exchanger and the sub-heat-exchanger.

2. The heat pump system of claim 1, wherein the sub-heat-exchanger is connected to the refrigerant line connecting the heat-exchanger and the first expansion valve, and the refrigerant line connecting the evaporator and the compressor, respectively.

3. The heat pump system of claim 1, wherein the heat-exchanger is configured to condensate or evaporate the refrigerant by exchanging heat with ambient air based on a selective operation of the third expansion valve.

4. The heat pump system of claim 1, wherein the second expansion valve and the third expansion valve are electronic expansion valves configured to selectively expand the refrigerant while controlling a flow of the refrigerant.

5. The heat pump system of claim 1, wherein, in the heating mode of a vehicle interior:
the refrigerant line connecting the sub-heat-exchanger and the first expansion valve is closed;
the refrigerant line connecting the first expansion valve and the evaporator is closed;
the first connection line is opened by an operation of the second expansion valve;
the second connection line is closed by the operation of the second expansion valve;
the third connection line is closed by an operation of the third expansion valve;
the refrigerant discharged from the internal condenser flows along the refrigerant line, and flows into the heat-exchanger along the refrigerant line opened by the third expansion valve;
the second expansion valve is configured to flow the refrigerant introduced via the first connection line to the chiller without expansion; and
the third expansion valve is configured to expand the refrigerant introduced via the refrigerant line, and flow the expanded refrigerant into the heat-exchanger.

6. The heat pump system of claim 5, wherein the heat-exchanger is configured to recollect ambient air heat while evaporating the refrigerant supplied from the third expansion valve by exchanging heat with ambient air.

7. The heat pump system of claim 5, wherein the sub-heat-exchanger is configured to exchange heat between the refrigerant having passed through the heat-exchanger and the refrigerant having passed through the chiller.

8. The heat pump system of claim 1, wherein, in a heating and dehumidifying mode of a vehicle interior:
the refrigerant line connecting the first expansion valve and the evaporator is opened by an operation of the first expansion valve;
the refrigerant line connecting the third expansion valve and the heat-exchanger and the refrigerant line connecting the heat-exchanger and the sub-heat-exchanger is closed by an operation of the third expansion valve;
the first connection line is closed by an operation of the second expansion valve;
the second connection line is opened by the operation of the second expansion valve;
the third connection line is opened by the operation of the third expansion valve;
a partial refrigerant among the refrigerant discharged from the internal condenser flows into the second connection line;
a remaining refrigerant among the refrigerant discharged from the internal condenser flows into the third connection line;
the first expansion valve is configured to expand the refrigerant introduced via the refrigerant line;
the second expansion valve is configured to expand the refrigerant introduced via the second connection line and flow the expanded refrigerant to the chiller; and
the third expansion valve is configured to flow the refrigerant introduced via the refrigerant line to the third connection line without expansion.

9. The heat pump system of claim 8, wherein the sub-heat-exchanger is configured to exchange heat between i) the refrigerant flowing via the third connection line and the refrigerant line and ii) the refrigerant respectively discharged from the evaporator and the chiller and introduced through the refrigerant line.

10. The heat pump system of claim 1, wherein, when defrosting the heat-exchanger in the heating mode of a vehicle interior:
the refrigerant line connecting the sub-heat-exchanger and the first expansion valve is closed;
the refrigerant line connecting the first expansion valve and the evaporator is closed;
the refrigerant line connecting the third expansion valve and the heat-exchanger and the refrigerant line connecting the heat-exchanger and the sub-heat-exchanger are closed by an operation of the third expansion valve;
the first connection line is opened by an operation of the second expansion valve;
the second connection line is closed by the operation of the second expansion valve;
the third connection line is opened by the operation of the third expansion valve;
the refrigerant discharged from the internal condenser flows into the third connection line;
the second expansion valve is configured to expand the refrigerant introduced via the first connection line and flow the expanded refrigerant to the chiller; and
the third expansion valve is configured to flow the refrigerant introduced via the refrigerant line to the third connection line without expansion.

11. The heat pump system of claim 10, wherein the sub-heat-exchanger is configured to exchange heat between the refrigerant flowing via the third connection line and the refrigerant line and the refrigerant discharged from the chiller and introduced via the refrigerant line.

12. The heat pump system of claim 1, further comprising an accumulator provided in the refrigerant line between the evaporator and the compressor.

13. The heat pump system of claim 1, wherein the sub-heat-exchanger is a double-tube heat-exchanger configured to exchange heat between refrigerants having different temperatures.

14. The heat pump system of claim 1, wherein the chiller is connected to a heating element via a coolant line through which the coolant circulates.

15. The heat pump system of claim 14, wherein, when defrosting the heat-exchanger in the heating mode of a vehicle interior, or in a heating and dehumidifying mode of the vehicle interior, the coolant circulates via the coolant line such that the coolant having passed through the heating element is supplied to the chiller.

16. The heat pump system of claim 14, wherein the chiller is configured to recollect a waste heat of the heating element while exchanging heat between the coolant introduced via the coolant line and the refrigerant, or configured to cool the heating element by using the coolant having exchanged heat with the refrigerant.

* * * * *